United States Patent [19]

Boudeman

[11] 3,739,561
[45] June 19, 1973

[54] PORTABLE, LIGHT-WEIGHT FRUIT GATHERING DEVICE

[75] Inventor: Robert J. Boudeman, Hickory Corners, Mich.

[73] Assignee: Wells Manufacturing Corporation, Three Rivers, Mich.

[22] Filed: Apr. 17, 1972

[21] Appl. No.: 244,736

[52] U.S. Cl. .............................................. 56/329
[51] Int. Cl. .......................................... A01g 19/06
[58] Field of Search ................... 56/328–340; 193/7

[56] References Cited
UNITED STATES PATENTS
370,368  9/1887  Benedict .............................. 56/329

FOREIGN PATENTS OR APPLICATIONS
462,390  11/1913  France ................................ 56/329
803,127  10/1958  Great Britain ....................... 56/329

Primary Examiner—Russell R. Kinsey
Attorney—Gordon W. Hueschen and Talivaldis Cepuritis

[57] ABSTRACT

A portable, light-weight fruit gathering device, suitable for use in conjunction with mechanical fruit harvesting means, comprises a rigid articulated frame made up of an elongated central member and a pair of opposed, U-shaped frame members with depending legs pivotally mounted at the terminal portions thereof on said central member, a flexible sheet material coextensively mounted on said frame and provided with a fruit discharge opening, flexible web means attached at both ends of said frame and limiting the pivot of the frame members to less than 180° relative to each other, and a fruit discharge chute attached to the flexible sheet material around the periphery of the discharge opening.

4 Claims, 3 Drawing Figures

PATENTED JUN 19 1973
3,739,561
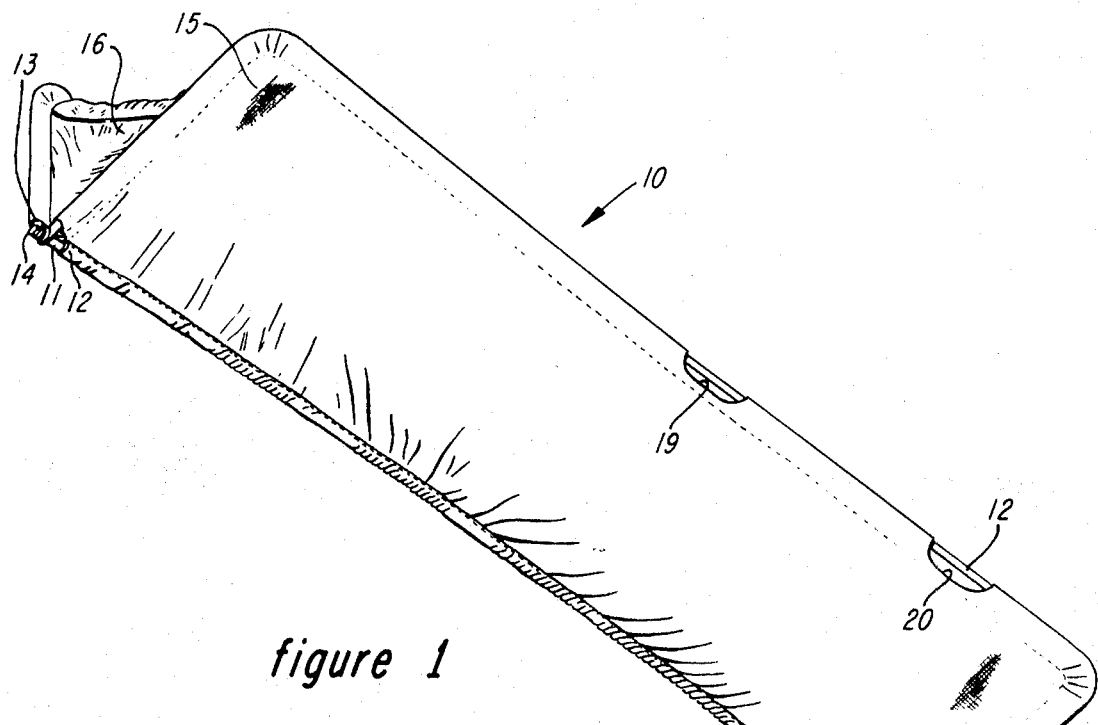
figure 1
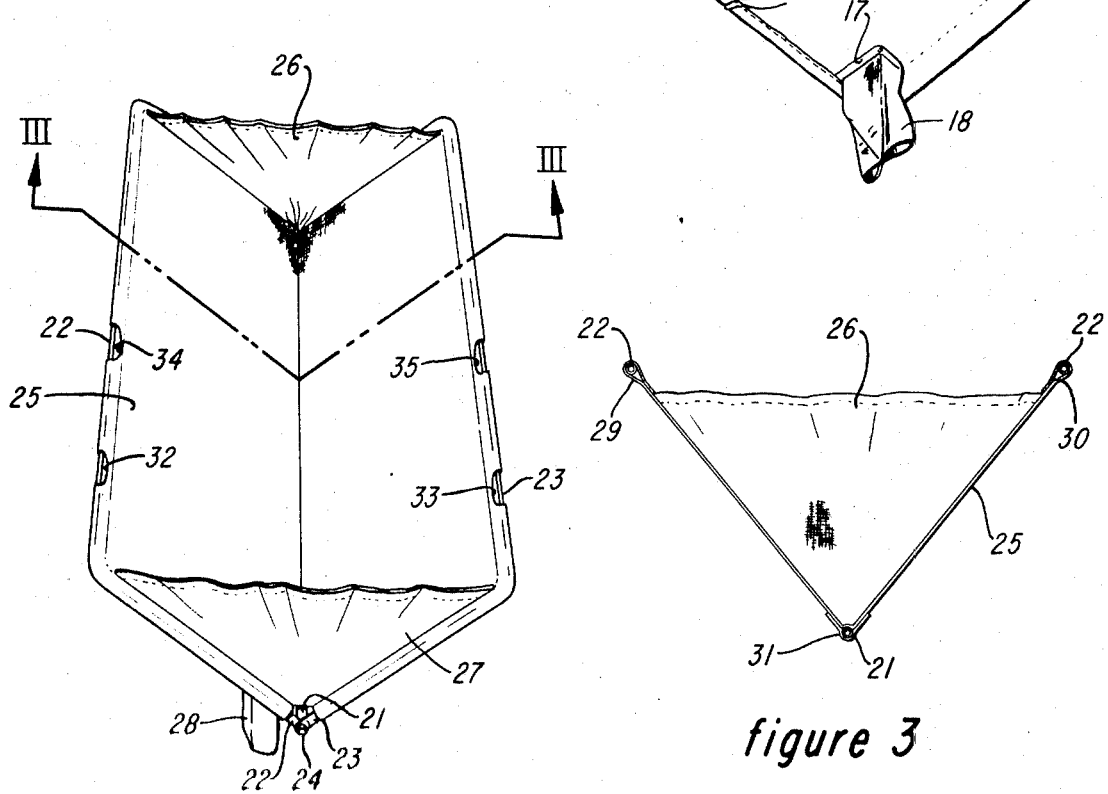
figure 2
figure 3

PORTABLE, LIGHT-WEIGHT FRUIT GATHERING DEVICE

BACKGROUND OF THE INVENTION

This invention relates to portable fruit gathering devices. The increasing use of mechanical harvesting devices which impart vibrations of predetermined frequency and amplitude to a fruitbearing tree or bush, has created a need for a fruit gathering device which would enable the gathering in of fruit before they drop to the ground. The need is particularly acute with berries such as cherries, blueberries, coffee cherries, and the like, which are very difficult to gather up once on the ground.

Accordingly, it is an object of this invention to provide a portable, light-weight fruit gathering device which can be readily handled by one person while the fruit from a tree or bush are being dislodged by means of a mechanical harvester.

A further object of this invention is to provide a fruit gathering device which is compact and relatively inexpensive, and which requires a minimum of storage space when not in use.

Yet another object is to provide a gathering device which forms a relatively soft cushion for the falling fruit.

Still other objects of this invention will readily present themselves to one skilled in the art upon reference to the ensuing specification and the drawing.

SUMMARY OF THE INVENTION

The present invention contemplates a fruit gathering device which is portable, light in weight, and compact, and which includes a rigid articulated frame defined by an elongated central member and a pair of U-shaped frame members with depending legs pivotally mounted at the terminal portions thereof on said central member. A flexible sheet material is mounted on the articulated frame and is coextensive therewith. The sheet material is provided with a fruit discharge opening near one end of the central elongated member. Flexible web means are attached at both ends of the articulated frame to adjacent legs of the pair of U-shaped frame members and limit the pivot of the frame members to less than 180° relative to each other. A fruit discharge chute is attached to the flexible sheet material around the periphery of the discharge opening.

BRIEF DESCRIPTION OF THE DRAWING

In the drawing,

FIG. 1 is a side perspective view of the fruit gathering device of this invention;

FIG. 2 is a top perspective view of the fruit gathering device of this invention; and FIG. 3 is a sectional elevation of the fruit gathering device shown in FIG. 2 taken along line III — III.

DESCRIPTION OF PREFERRED EMBODIMENTS

Referring to FIG. 1, fruit gathering device 10 is made up of elongated central member 11 on which are mounted opposed U-shaped frame members 12 and 13. The depending legs of frame members 12 and 13 are pivotally mounted at the terminal portions thereof on central member 11, for example by means of threaded bolt 14.

Flexible sheet material 15 provides a relatively soft cushion for the fruit and can be mounted on said articulated frame in any convenient manner, for example by forming loops around the edge of the material and thereafter passing frame members 12 and 13 through the loops before the pivotal connection with central member 11 is made. The sheet material preferably is nylon fabric; however, other materials such as canvas, plastic sheet, foam rubber, dacron fabric, and the like, can be used as well. The frame members and the central elongated member preferably are formed from a hollow tubular material such as aluminum in order to reduce weight, but other bar- or rod-like materials such as wood, plastic, fiberglass, or the like, can also be employed.

Flexible web 16 is attached to adjacent depending legs of opposing frame members 12 and 13 at one end of the articulated frame and limits pivot of frame members 12 and 13 to less than 180°. Preferably the maximum spread of frame members 12 and 13 is about 140°. A similar web is provided at the other, normally lower, end of the frame. Flexible webs such as web 16 also serve to retain fruit within the gathering device because, when device 10 is spread apart under a tree or bush in use, a substantially V-shaped trough is formed with the webs blocking the ends of the trough. When device 10 is not in use, it is collapsed by pivoting frame members 12 and 13 against each other, thereby providing a flat, compact item which can be readily stored in a minimum amount of space.

Fruit discharge opening 17 is provided in flexible sheet material 15 near the end of central member 11 that will be the lower end when device 10 is in use. Around the periphery of this opening is attached fruit discharge chute 18 which guides the fruit received within device 10 to a suitable pouch carried by the manipulator of device 10 or to an appropriate container situated on the ground.

Cutouts 19 and 20 can be made in flexible sheet material 15 so as to provide convenient hand grips for device 10, if desired. Size of device 10 is not critical and is determined primarily by the type of fruit that is to be harvested. The longitudinal dimension of device 10 can range from about 4 feet, and shorter, to about 8 feet, and longer. The width of each side can range from about 1 foot to about 4 feet.

An alternate embodiment of this invention is shown in FIGS. 2 and 3. where the articulated frame is made up by central elongated member 21 together with opposed, U-shaped frame members 22 and 23 pivotally mounted on elongated member 21 by threaded bolts such as bolt 24. Flexible sheet material 25 is stretched over the articulated frame and webs 26 and 27 are attached between the adjacent depending legs of frame members 22 and 23. Discharge chute 28 is provided with a closed lower end and is removably attached to a discharge opening provided in flexible sheet material 25 by means of hook- or snap-type fasteners, or the like. In essence, in this particular embodiment discharge chute 28 functions as a receptacle which can be filled as the fruit are harvested and then readily replaced with an empty one when full.

Frame members 22 and 23, as well as elongated member 21, are tubular, and flexible sheet material 25 is secured thereto by means of respective loops 29, 30 and 31, conveniently formed in sheet material 25.

Pairs of cutouts such as 32 and 33, or 34 and 35, can be made in sheet material 25 to provide convenient handgrips.

In use, the fruit gathering device of this invention is spread apart to form a V-shaped trough as shown in FIGS. 1 and 2 and placed under a fruit bearing tree or bush at an incline and with the discharge chute at the lower end, The tree or bush is then subjected to shaking. The dislodged fruit are caught in the trough and roll downwardly under the influence of gravity to the discharge opening and out through the discharge chute into an appropriate receiving means. Webs 26 and 27 prevent spillage of the gathered fruit onto the ground.

The foregoing description and the drawing are intended as illustrative and are not to be construed as limiting. Still other variations within the spirit and scope of this invention are possible and will become apparent to the skilled artisan.

I claim:

1. A portable, light-weight fruit gathering device comprising
   an elongated central member;
   a pair of opposed, U-shaped frame members with depending legs pivotally mounted at the terminal portions thereof on said central member and together with said central member defining a rigid articulated frame;
   a flexible sheet material mounted on said frame, coextensive therewith, and provided with a fruit discharge opening near one end of said central member;
   a flexible web means attached at both ends of said articulated frame to adjacent legs of said pair of opposed, U-shaped frame members and limiting the pivot of said frame members to less than 180° relative to each other; and
   a fruit discharge chute attached to said flexible sheet material around the periphery of said discharge opening.

2. The fruit gathering device of claim 1 wherein the fruit discharge chute is provided with a closed end and is removably attached to said flexible sheet material.

3. The fruit gathering device of claim 1 wherein said flexible sheet material is affixed to the U-shaped frame members and to the central member.

4. The fruit gathering device of claim 1 wherein the flexible sheet material has cutouts exposing portions of said U-shaped frame members and providing hand grip means for said device.

* * * * *